(12) United States Patent
Lourenco et al.

(10) Patent No.: US 11,149,531 B2
(45) Date of Patent: *Oct. 19, 2021

(54) PRODUCING PRESSURIZED AND HEATED FLUIDS USING A FUEL CELL

(71) Applicants: 1304342 Alberta Ltd., Edmonton (CA); 1304338 Alberta Ltd., Edmonton (CA)

(72) Inventors: Jose Lourenco, Edmonton (CA); Mackenzie Millar, Edmonton (CA)

(73) Assignees: 1304342 Alberta Ltd., Edmonton (CA); 1304338 Alberta Ltd., Edmonton (CA)

( * ) Notice: Subject to any disclaimer, the term of this patent is extended or adjusted under 35 U.S.C. 154(b) by 358 days.

This patent is subject to a terminal disclaimer.

(21) Appl. No.: 15/767,102

(22) PCT Filed: Nov. 4, 2015

(86) PCT No.: PCT/CA2015/051136
§ 371 (c)(1),
(2) Date: Apr. 9, 2018

(87) PCT Pub. No.: WO2017/059516
PCT Pub. Date: Apr. 13, 2017

(65) Prior Publication Data
US 2019/0071959 A1    Mar. 7, 2019

(30) Foreign Application Priority Data

Oct. 8, 2015    (WO) ................ PCT/CA2015/051022

(51) Int. Cl.
*H01M 8/0668*    (2016.01)
*H01M 8/04014*    (2016.01)
(Continued)

(52) U.S. Cl.
CPC .......... *E21B 43/2408* (2013.01); *C09K 8/592* (2013.01); *C09K 8/594* (2013.01);
(Continued)

(58) Field of Classification Search
CPC ... C09K 8/594; C09K 8/592; H01M 8/04014; H01M 8/0668; H01M 8/04164;
(Continued)

(56) References Cited

U.S. PATENT DOCUMENTS 2,446,925 A    8/1948 Hemminger
2,495,613 A    1/1950 Tuttle
(Continued)

FOREIGN PATENT DOCUMENTS

CA    1098852 A1    4/1981
CA    2691392 A1    2/2007
(Continued)

OTHER PUBLICATIONS

International Search Report dated Aug. 26, 2010, issued in International Application No. PCT/CA2010/000530, filed Apr. 7, 2010, 3 pages.
(Continued)

*Primary Examiner* — Golam Mowla
(74) *Attorney, Agent, or Firm* — Christensen O'Connor Johnson Kindness PLLC

(57) ABSTRACT

A method of producing temperature and pressure conditioned fluids using a fuel cell. The fuel cell generates an anode exhaust stream of water vapour and carbon dioxide. The water in the exhaust stream is condensed and separated to produce a stream of water and a stream of carbon dioxide. A first portion of the stream of water is heated to produce a stream of steam, which is combined with the fuel to form the anode input stream. A stream of condensed carbon dioxide is obtained by condensing at least a portion of the carbon dioxide in the stream of carbon dioxide. At least one fluid is heated and compressed to a target temperature and pressure
(Continued)

for each fluid, the at least one fluid comprising a second portion of the stream of water or at least a portion of the condensed carbon dioxide.

16 Claims, 16 Drawing Sheets

(51) Int. Cl.
| | |
|---|---|
| H01M 8/04119 | (2016.01) |
| C09K 8/592 | (2006.01) |
| C09K 8/594 | (2006.01) |
| E21B 43/24 | (2006.01) |
| E21B 36/00 | (2006.01) |
| E21B 43/16 | (2006.01) |
| F24H 8/00 | (2006.01) |

(52) U.S. Cl.
CPC .......... *E21B 36/008* (2013.01); *E21B 43/164* (2013.01); *E21B 43/24* (2013.01); *F24H 8/00* (2013.01); *H01M 8/04014* (2013.01); *H01M 8/04164* (2013.01); *H01M 8/0668* (2013.01); *H01M 2250/10* (2013.01); *Y02B 30/52* (2013.01); *Y02P 70/50* (2015.11)

(58) Field of Classification Search
CPC ................ H01M 2250/10; E21B 43/24; E21B 43/2408; E21B 43/164; E21B 36/008; Y02E 60/50; F24H 8/00; Y02B 30/00; Y02B 30/52; Y02P 70/50; Y02P 20/10
See application file for complete search history.

(56) References Cited

U.S. PATENT DOCUMENTS

| | | | |
|---|---|---|---|
| 4,094,767 A | 6/1978 | Gifford, II | |
| 4,187,672 A | 2/1980 | Rasor | |
| 4,213,826 A | 7/1980 | Eddinger et al. | |
| 4,265,736 A | 5/1981 | Thayer | |
| 4,306,961 A | 12/1981 | Taciuk | |
| 4,323,446 A | 4/1982 | Chervenak et al. | |
| 4,404,086 A | 9/1983 | Oltrogge | |
| 4,459,201 A | 7/1984 | Eakman et al. | |
| 4,561,966 A | 12/1985 | Owen et al. | |
| 5,039,579 A | 8/1991 | Kinoshita | |
| 5,133,406 A | 7/1992 | Puri | |
| 5,232,793 A | 8/1993 | Miyauchi et al. | |
| 5,402,847 A | 4/1995 | Wilson et al. | |
| 5,536,488 A | 7/1996 | Mansour et al. | |
| 7,550,063 B2 | 6/2009 | Gawad | |
| 7,753,972 B2* | 7/2010 | Zubrin | E21B 43/164 48/61 |
| 7,946,346 B2* | 5/2011 | Zornes | H01M 8/04022 166/309 |
| 8,088,528 B2 | 1/2012 | Lourenco et al. | |
| 8,585,891 B2 | 11/2013 | Lourenco et al. | |
| 8,616,294 B2* | 12/2013 | Zubrin | E21B 43/168 166/402 |
| 9,132,415 B2 | 9/2015 | Lourenco et al. | |
| 9,605,523 B2* | 3/2017 | Zubrin | E21B 43/168 |
| 2003/0022035 A1 | 1/2003 | Galloway | |
| 2004/0229103 A1 | 11/2004 | Seshadri et al. | |
| 2005/0271914 A1 | 12/2005 | Farooque et al. | |
| 2006/0159967 A1 | 7/2006 | Huijsmans et al. | |
| 2008/0296018 A1 | 12/2008 | Zubrin et al. | |
| 2009/0155637 A1* | 6/2009 | Cui | H01M 8/04164 429/420 |
| 2010/0163226 A1 | 7/2010 | Zornes | |
| 2011/0094940 A1 | 4/2011 | Weisselberg | |
| 2011/0163011 A1 | 7/2011 | Yarbro | |
| 2011/0206571 A1 | 8/2011 | Skinner et al. | |
| 2012/0251898 A1 | 10/2012 | Lehar et al. | |
| 2013/0118735 A1* | 5/2013 | Jamal | H01M 8/0618 166/266 |
| 2014/0272617 A1 | 9/2014 | Berlowitz et al. | |
| 2014/0338901 A1 | 11/2014 | Sites et al. | |
| 2015/0188172 A1 | 7/2015 | Yun et al. | |
| 2015/0361833 A1* | 12/2015 | Hinders | F01K 3/242 290/1 R |

FOREIGN PATENT DOCUMENTS

| | | |
|---|---|---|
| CA | 2641747 A1 | 10/2008 |
| CA | 2515999 C | 12/2012 |
| CA | 2920656 C | 3/2018 |
| CN | 101498229 A | 1/2008 |
| CN | 102937016 A | 2/2013 |
| GB | 977905 A | 12/1964 |
| GB | 2471862 A | 1/2011 |
| JP | 2006104261 A | 4/2006 |
| WO | 2005001977 A1 | 1/2005 |
| WO | 2010115283 A1 | 10/2010 |
| WO | 2011081665 A1 | 7/2011 |
| WO | 2012000115 A1 | 1/2012 |
| WO | 2012092404 A1 | 7/2012 |
| WO | 2014138208 A1 | 9/2014 |
| WO | 2015059507 A1 | 4/2015 |
| WO | 2015-106820 A1 | 7/2015 |

OTHER PUBLICATIONS

International Search Report dated Oct. 31, 2011, issued in International Application No. PCT/CA2011/050403, filed Jun. 30, 2011, 3 pages.
International Search Report and Written Opinion dated Feb. 24, 2014, issued in International Application No. PCT/CA2013/050955, filed Dec. 12, 2013, 7 pages.
International Search Report and Written Opinion dated Jun. 20, 2016, issued in International Application No. PCT/CA2015/051022, filed Oct. 8, 2015, 7 pages.
Jacobs Consultancy, "Evaluation of Integrating a Molten Carbonate Fuel Cell (MCFC) with a SADG Facility" prepared for Alberta Innovates—Energy and Environment Solutions, Jul. 2015, 77 pages.
International Search Report and Written Opinion dated Feb. 21, 2017, issued in International Application No. PCT/CA2016/051408, filed Dec. 1, 2016, 9 pages.
Hisato, A., "Upgrading of Heavy Cruse Oil—Supercritical Water Cracking Technology", JOGMEC Techno Forum 2014, Nov. 26-27, 2014.
Hill, R., et al., "Application of molten carbonate fuel cell for CO2 capture in thermal in situ oil sands facilities," International Journal of Greenhouse Gas Control 41(2015) 276-284.
Hamelinck, C.N., et al., "Potential for CO2 sequestration and Enhanced Coalbed Methane production in the Netherlands," NOVEM Programme No. 234.1, Mar. 2001 (ISBN 90-5847-020-4).
International Search Report and Written Opinion dated May 31, 2016, issued in International Application No. PCT/CA2015/051136, filed Nov. 4, 2015, 13 pages.
International Search Report and Written Opinion dated Mar. 27, 2017, issued in International Application No. PCT/CA2017/050062, filed Jan. 20, 2017, 7 pages.

\* cited by examiner

PRODUCING PRESSURIZED AND HEATED FLUIDS USING A FUEL CELL

FIELD

This relates to a process that recovers the anode exhaust stream components and thermal energy of a fuel cell to produce heated and pressurized fluids.

BACKGROUND

Fuel cells are used to produce an electric current directly from a chemical reaction based on a fuel stream of reactants, rather than by combustion. The main products are electricity, and exhaust streams of gas. The exhaust streams will depend on the type of fuel used to power the fuel cell. One common type of fuel cell is powered by hydrocarbons, and produces an exhaust stream of water and carbon dioxide, and other components. There may be other components in the exhaust stream, such as hydrogen, etc., depending on the inputs and the reaction in the fuel cell.

U.S. Pat. No. 8,088,528 (Lourenco) entitled "Method to condense and recover carbon dioxide from fuel cells" relates to the recovery of a fuel cell exhaust stream at gas pressure reduction stations in a natural gas distribution system.

SUMMARY

According to an aspect, the method disclosed herein may be used to enhance the production of heavy oil or bitumen from underground oil deposits into a production well pipeline. The method reduces a reservoir heavy oil viscosity by injecting exhaust gases typically released into the atmosphere from consumption of natural gas. These exhaust gases and their thermal energy are preferentially recovered from an anode exhaust stream of a fuel cell. The natural gas fuel cell anode exhaust stream composition, unlike a natural gas combustion exhaust stream, is primarily carbon dioxide and water. The total mass flowrate of a fuel cell anode exhaust stream is typically less than 23% of an exhaust gas stream from a natural gas combustion process and hence is easier to recover and re-use. In the disclosed process, a fuel cell anode exhaust stream is cooled, condensed, recovered, pumped, re-heated and routed to an injection well pipeline at the optimal reservoir operating pressure and temperature. This is another feature of the process, capable of meeting a wide range of reservoir pressure and temperature operation parameters compared to existing gravity drainage processes.

According to an aspect, the method may be used to enhance the production of heavy oil or bitumen from underground oil deposits. The process recovers the anode exhaust stream and its thermal energy from a power generation natural gas fuel cell to heat, displace and flow heavy oil in a reservoir to a production well pipeline at optimal reservoir pressure and temperature conditions. The process of generating power with a natural gas fuel cell differs from standard power generation plants that use natural gas. In a fuel cell, natural gas is consumed at the anode by an electrochemical reaction that produces electricity and a hot exhaust stream of gases, mainly water vapor and carbon dioxide. The other power generation plants combust natural gas to produce electricity and a large hot exhaust gas stream, mainly nitrogen oxide.

The method discussed herein benefits from recovering the fuel cell anode exhaust stream and its thermal energy to enhance the production of heavy oil. It is well documented that $CO_2$ injection into oil fields result in an increase in heavy oil production. Today, operators inject more than 1.6 billion cubic feet per day into Permian Basin fields in the U.S., to produce 170,000 barrels of incremental oil per day as reported by the National Energy Technology Laboratory of the U.S. Department of Energy. Unlike current $CO_2$ injection methods where it is first processed, compressed and pipeline transported to well sites, the inventive process generates and pumps the $CO_2$ at point of use. The use of steam to heat underground oil deposits is well documented and proven as per the SAGD process. Unlike the above processes, the present method may be used to meet optimal reservoir pressure and temperature conditions with substantially less energy consumption.

Some aspects of the method may include: power generation by chemical reaction of natural gas in a fuel cell at an oil production field; elimination or reduction in GHG emissions, as the fuel cell anode exhaust stream may be fully recovered and injected into the oil reservoir, 5 Kg of water and carbon dioxide per Kg of methane reacted in a fuel cell; elimination or reduction in external water requirements as a fuel cell power plant is a net water producer, where the anode chemical reaction of hydrogen with oxygen by stoichiometry produces 2.25 Kg of water per Kg of methane; production of carbon dioxide in-situ, the anode chemical reaction of carbon with oxygen by stoichiometry produces 2.75 Kg of carbon dioxide per Kg of methane; recovery of a fuel cell anode exhaust stream and its thermal energy to enhance oil production; the ability to deliver the recovered anode exhaust stream at optimal reservoir pressure and temperature; a substantial reduction in energy consumption versus current practices of oil production processes.

In one embodiment, the process may produce electricity for export from a carbonate fuel cell and recovers its anode exhaust stream of carbon dioxide and water to inject into an oil reservoir at optimal pressure and temperature operation conditions to enhance oil production. The process for the enhancement of oil production at an oil field may comprise: reducing the natural gas pressure supply to the fuel cell anode through an expander generator, producing electricity and a refrigerant natural gas stream; causing the refrigerant natural gas fuel cell anode supply stream to enter a heat exchanger in a counter-current flow with the gaseous anode exhaust stream to cool and condense carbon dioxide; causing the fuel cell anode natural gas supply stream to exit the counter-current heat exchanger and be further heated in another counter-current heat exchanger by the cathode exhaust gaseous stream; causing the heated natural gas supply stream to enter the fuel cell anode where it is converted by steam reforming and electrochemical reactions into electricity and a high temperature anode exhaust gas stream of mainly carbon dioxide and water; pre-cooling the high temperature anode exhaust gas stream in a counter-current flow heat exchanger with the recovered water; further cooling the anode exhaust gas stream in a counter-current flow heat exchanger with the recovered carbon dioxide to condense the water fraction of the anode exhaust gas stream; recovering the condensed water fraction of the anode exhaust gas stream in a gas/liquid separator and routing the separated anode exhaust gaseous carbon dioxide stream for further cooling in a counter-current heat exchanger with the recovered liquid carbon dioxide stream; further cooling the anode exhaust gaseous carbon dioxide stream in a counter-current heat exchanger with a cold carbon dioxide gaseous stream; further cooling the anode exhaust gaseous carbon dioxide stream in a counter-current heat exchanger with the fuel cell anode refrigerant natural gas supply stream to condense the carbon dioxide; pumping the recovered liquid carbon dioxide stream to optimal oil reservoir pressure and heating the recovered liquid carbon dioxide stream in a heat exchange in a counter-current flow with the anode exhaust stream to optimal oil reservoir temperature and routing it to an injection well pipeline; pumping to optimal oil reservoir pressure the recovered water stream and heat exchange in a counter-current flow with the anode exhaust stream to optimal oil reservoir temperature and routing it to an injection well pipeline; mixing the gaseous carbon dioxide stream from the carbon dioxide separator with fresh air and catalysing the mixture in a catalytic oxidizer to heat this oxidant stream up to fuel cell cathode temperature, where the cathode consumes oxygen from the air and the carbon dioxide to produce a carbonate ion that is transferred through the fuel cell electrolyte layer to the anode to react with the anode hydrogen producing; water, carbon dioxide and electricity; and routing a portion of the recovered water to produce steam in a counter-current flow heat exchanger with the cathode exhaust gas stream to supply steam reformer at the anode.

The process described herein may enhance oil field production by first recovering the water and carbon dioxide from a fuel cell anode exhaust stream, and second, by pumping and heating them in a counter-current heat exchangers to optimal oil reservoir operating conditions before they enter the injection well pipeline to heat and reduce the viscosity of oil in a reservoir. The process may allow the elimination of the current industry practices of steam generation for SAGD operations and substantially reduce its associated environmental challenges. Moreover, it recovers and provides carbon dioxide, a solvent for oil production enhancement at point of use.

As will hereinafter be described, the above method can operate at any oil field production sites where heat, water and solvents are required to enhance oil production.

The method described herein was developed with a view to supply thermal energy, water and carbon dioxide to oil production fields from a fuel cell anode exhaust stream, thereby eliminating the need for an external water source and its processing for steam generation as well as the energy required to produce it. The process added benefit is the recovery and supply in-situ of a GHG emission gas, carbon dioxide, an oil miscible solvent that reduces oil viscosity and enhances oil production at a reservoir.

As will hereinafter be further described, there is provided, in one aspect, an oil production enhancement process, which includes a natural gas supply stream to a fuel cell, first reducing the natural gas pressure through a gas expander/generator producing a refrigerant natural gas stream and electricity. The refrigerant natural gas stream is pre-heated in a counter-current heat exchanger with a separated anode exhaust gaseous stream to condense and produce liquid carbon dioxide. The heated fuel cell natural gas stream is further heated and fed to the fuel cell anode where first it is steam reformed to produce hydrogen and carbon dioxide, the hydrogen is further reacted with a carbonate ion to produce water, carbon dioxide and electricity. The anode hot exhaust gas stream, is cooled, condensed, separated, recovered, pumped and re-heated to optimal oil reservoir pressure and temperature operation conditions before injection into an oil reservoir to heat and reduce oil viscosity for the enhancement of oil production. The current industry practices of oil production use steam generated from natural bodies of water and or imported solvents. The objective of the process is to provide the steam and solvent required for enhancing oil production from a by-product of a power plant, the fuel cell anode exhaust stream.

According to an aspect, there is provided a method of producing temperature and pressure conditioned fluids using a fuel cell, the fuel cell having an anode inlet, an anode exhaust, a cathode inlet, and a cathode exhaust, the method comprising the steps of: operating the fuel cell to generate an anode exhaust stream comprising water vapour and carbon dioxide; condensing and separating water from the anode exhaust stream to produce a stream of water and a stream of carbon dioxide; heating a first portion of the stream of water to produce a stream of steam; combining the stream of steam and the fuel to form the anode input stream; obtaining a stream of condensed carbon dioxide by condensing at least a portion of the carbon dioxide in the stream of carbon dioxide; heating and compressing at least one fluid to a target temperature and pressure for each fluid, the at least one fluid comprising a second portion of the stream of water or at least a portion of the condensed carbon dioxide.

According to an aspect, there is provided a method to condense, recover, pump and re-heat an anode exhaust stream from a natural gas-powered fuel cell prior to injection into an oil reservoir to enhance the production of oil, the fuel cell having an anode, a cathode, and a cathode exhaust stream, the anode exhaust stream comprising water vapour and carbon dioxide, the method comprising the steps of: providing a refrigerated natural gas supply stream; passing the refrigerant natural gas supply stream and a fuel cell anode exhaust stream through a first heat exchanger to condense carbon dioxide from the fuel cell anode exhaust stream and produce a fuel cell natural gas stream; condensing a steam component of the anode exhaust stream and separating the condensed steam from the gaseous carbon dioxide and residual hydrogen; condensing and separating at least a portion of the carbon dioxide from the gaseous carbon dioxide and residual hydrogen that exits the water separator to produce a condensed carbon dioxide stream a carbon dioxide and residual hydrogen stream; combining the carbon dioxide and residual hydrogen stream with an input air stream mixed into a cathode input stream, the cathode input stream being pre-heated in a catalytic oxidizer prior to being input into the cathode of the fuel cell cathode; pressurizing and heating the condensed carbon dioxide to oil reservoir operating conditions to produce an injection stream of carbon dioxide; pressurizing and heating a first portion of the condensed steam to produce an anode input stream of steam; mixing the anode input stream of steam with the fuel cell natural gas stream heated supply of natural gas to produce an anode input stream; pressurizing and heating a second portion of the condensed steam to oil reservoir operating conditions to produce an injection stream of steam; and injecting the injection stream of carbon dioxide and the injection stream of steam into the oil reservoir.

According to an aspect, there is provided a method of injecting fluids into an underground formation using exhaust streams from a fuel cell, the fuel cell comprising an anode and a cathode, the fuel cell having an anode input stream comprising at least a fuel and water, a cathode input stream comprising at least oxygen and carbon dioxide, an anode exhaust stream comprising at least carbon dioxide and steam, and a cathode exhaust stream, the method comprising the steps of: condensing and separating water from the anode exhaust stream to produce a stream of water and a stream of carbon dioxide; heating a first portion of the stream of water to produce a stream of steam;

combining the stream of steam and the fuel to form the anode input stream; producing an injection stream of steam by heating and compressing a second portion of the stream of water to a desired temperature and pressure; obtaining a stream of condensed carbon dioxide by condensing at least a portion of the carbon dioxide in the stream of carbon dioxide; heating and compressing the stream of condensed carbon dioxide to a desired temperature and pressure to produce an injection stream of carbon dioxide gas; and injecting at least the injection stream of carbon dioxide gas into the underground formation.

According to an aspect, there is provided a method of producing supercritical fluids using a fuel cell, the fuel cell having an anode inlet, an anode exhaust, a cathode inlet, and a cathode exhaust, the fuel cell generating an anode exhaust stream comprising water vapour and carbon dioxide, the method comprising the steps of: providing a refrigerant natural gas supply stream; in a first heat exchanger, condensing at least a portion of the carbon dioxide from the fuel cell anode exhaust stream in a first path and heating the refrigerant natural gas supply stream in a second path to produce a heated refrigerant natural gas supply stream; producing an anode inlet stream by further heating the heated natural gas supply stream and mixing the heated natural gas supply stream with steam to cause at least a portion of the resulting mixture to reform into hydrogen and carbon dioxide; supplying the anode inlet stream to the anode inlet of the fuel cell; passing the anode exhaust stream through one or more third heat exchangers to condense the water vapour and separating the condensed water vapour in a water separator; providing a separator to recover the condensed steam and separate the gaseous carbon dioxide and residual hydrogen for further cooling; passing the anode exhaust stream exiting the water separator through one or more fourth heat exchangers to condense at least a portion of the carbon dioxide and separating the condensed carbon dioxide in a carbon dioxide separator; mixing the anode exhaust stream exiting the carbon dioxide separator with a stream of air to produce a cathode inlet stream and preheating the cathode inlet stream in a catalytic oxidizer to a desired cathode inlet temperature; supplying the cathode inlet stream to the cathode inlet; pressurizing and heating the condensed carbon dioxide to achieve a supercritical state of carbon dioxide; pressurizing and heating a portion of the condensed water vapour to produce steam for mixing with the heated natural gas supply stream; and pressurizing and heating a further portion of the condensed water vapour to achieve a supercritical state of steam.

According to an aspect, there is provided a method of producing supercritical fluids using a fuel cell, the fuel cell having an anode inlet, an anode exhaust, a cathode inlet, and a cathode exhaust, the method comprising the steps of: operating the fuel cell to generate an anode exhaust stream comprising water vapour and carbon dioxide; condensing and separating water from the anode exhaust stream to produce a stream of water and a stream of carbon dioxide; heating a first portion of the stream of water to produce a stream of steam; combining the stream of steam and the fuel to form the anode input stream; obtaining a stream of condensed carbon dioxide by condensing at least a portion of the carbon dioxide in the stream of carbon dioxide; and heating and compressing at least one of a second portion of the stream of water and at least a portion of the condensed carbon dioxide to a supercritical state.

The methods may comprise one or more of the following aspects, as appropriate: the second portion of the stream of water and the at least a portion of the condensed carbon dioxide are each heated to a respective target temperature and pressure; the desired temperature and pressure comprises a supercritical state of the at least one fluid; the target temperature and pressure comprises a temperature and pressure suitable to enhance oil production; the fuel of the anode input stream may comprise a stream of hydrocarbons such as natural gas; the natural gas may be obtained from a supply of natural gas, with the supply of natural gas being used as a refrigerant to condense the portion of the carbon dioxide to form the stream of condensed carbon dioxide; the supply of natural gas may be a liquid natural gas (LNG) tank; the supply of natural gas may be a pressurized stream of natural gas, and wherein the pressurized stream of natural gas may be expanded and cooled to produce cold temperatures; the supply of natural gas may be passed through at least one of a refrigeration plant and a condenser and air cooler; the stream of carbon dioxide may be compressed to meet desired operations properties using a pressure enthalpy diagram of the stream; the method may further comprise the step of injecting at least one of water and a solvent into the oil bearing formation with the injection stream of carbon dioxide and the injection stream of steam; after condensing, the stream of carbon dioxide may be separated into the stream of condensed carbon dioxide and a cathode stream of carbon dioxide; the method may further comprise the step of combining oxygen and the cathode stream of carbon dioxide to form the cathode input stream; forming the cathode input stream may comprise combining the first stream of carbon dioxide and atmospheric air; the anode exhaust stream may further comprise residual hydrogen, and wherein the cathode stream of carbon dioxide may further comprise the residual hydrogen; forming the cathode input stream may further comprise preheating the first stream of carbon dioxide and oxygen in a combustion heater that is fuelled by a hydrocarbon and the residual hydrogen; and the method may further comprise the step of supplying carbon dioxide for the cathode input stream from a source of captured carbon dioxide.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

There will now be given a description of a process that produces conditioned fluids from the exhaust streams of a fuel cell.

Figure 1:
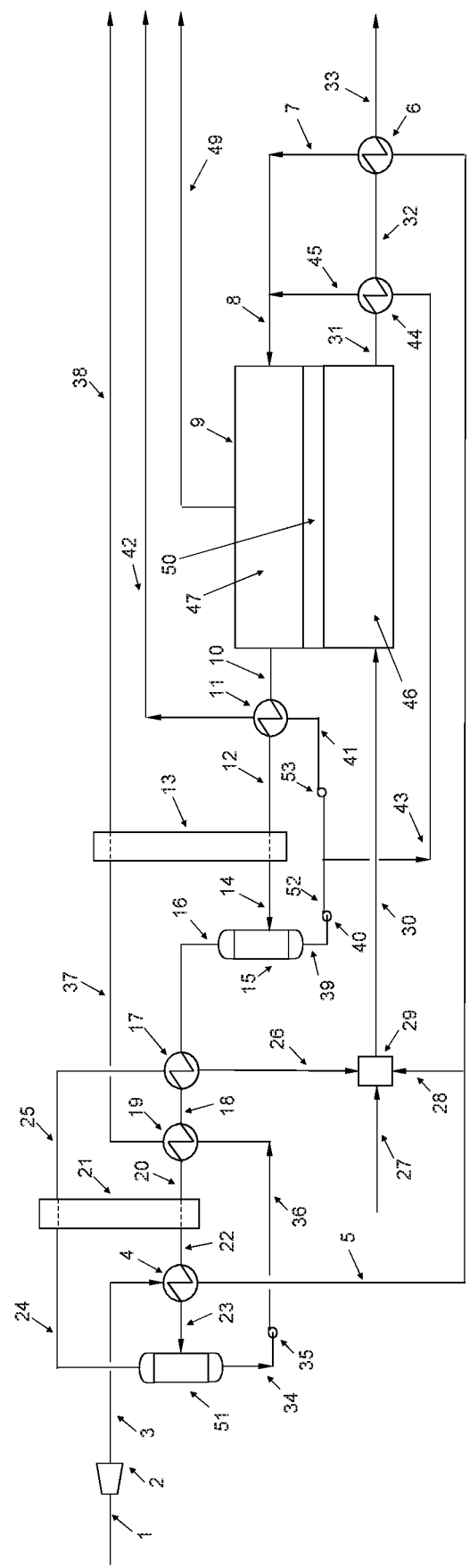
FIG. 1 is a schematic diagram of a fuel cell with the water, carbon dioxide and thermal energy of the anode exhaust stream being recovered.

FIG. 1 depicts a preferred method of recovering a fuel cell anode exhaust stream that includes water and carbon dioxide. Fuel cells such as the Direct Fuel Cell (DFC) manufactured by Fuel Cell Energy in the USA have been available since 2003. The largest DFC power generation plant is a 59 MW. A major advantage of a DFC power generation plant versus standard power generation plants is the smaller mass flow rate of the anode exhaust gas stream with a high concentration of carbon dioxide and water, allowing for ease of recovery and use.

In the depicted example, natural gas is delivered from a main transmission pipeline through stream 1 and enters an expander/generator 2 to reduce the main transmission pipeline pressure to meet fuel cell inlet pressure stream 3. The temperature of stream 3 is decreased by about 1.5 to 2 degrees Celsius for every 15 psi pressure drop. The cooler natural gas stream 3 enters heat exchanger 4 to give up its coolth to stream 22. A portion of natural gas stream 5 is routed through stream 28 to provide gas to air pre-heater 29. The balance of stream 5 is further heated in heat exchanger 6 by fuel cell cathode exhaust stream 32. The heated fuel cell gas stream 7 is mixed with steam stream 45, and enters the fuel cell 9 at anode section 47, through stream 8. At fuel cell anode 47, the natural gas/steam stream 8 is first reformed to produce hydrogen and carbon dioxide, the hydrogen through an electrochemical reaction with a carbonate ion produced in cathode 46, and transferred through an electrolyte layer 50 to the anode 47. The fuel cell reaction produces electricity stream 49, and a hot anode exhaust stream 10. The carbonate ion produced in cathode 46 and transferred through electrolyte layer 50 into anode 47 is converted back to carbon dioxide in the electrochemical reaction. The main components of hot anode exhaust stream 10 are steam and carbon dioxide with some residual hydrogen. The hot anode exhaust stream 10 enters heat exchanger 11 to give up some of its heat to water stream 41. The cooler anode exhaust stream 12 is further cooled in heat exchanger 13 to give up more of its heat to carbon dioxide stream 37. The cooler anode exhaust stream 14 enters separator 15 to separate and collect the condensed water component of the anode exhaust stream 14. The concentrated carbon dioxide anode exhaust stream 16 exits separator 15 and is further cooled in heat exchanger 17 by carbon dioxide stream 25. The colder concentrated carbon dioxide anode exhaust 18 is further cooled in heat exchanger 19 by liquid carbon dioxide stream 36 and further cooled in heat exchanger 21 by carbon dioxide stream 24, followed by yet more cooling in heat exchanger 4 by natural gas stream 3. The cold concentrated carbon dioxide anode exhaust stream 23 enters carbon dioxide separator 51 where the condensed carbon dioxide is separated from the gaseous carbon dioxide and residual hydrogen. The gaseous cold carbon dioxide stream and residual hydrogen stream 24 enters heat exchanger to give up some of its coolth to anode exhaust stream 20. The warmer stream 25 is further heated in heat exchanger 17 by anode exhaust stream 16, the heated gaseous carbon dioxide and residual hydrogen stream 26 is mixed with air stream 27 at air pre-heater 29 where the residual hydrogen is catalytically oxidized and the oxidant stream 30 is heated to a temperature suitable for cathode 46. The fuel cell cathode 46 consumes the oxygen from air stream 27 and the circulated carbon dioxide from stream 26 to produce carbonate ions that are transferred through electrolyte layer 50 to the fuel cell anode 47. The hot cathode exhaust stream exits fuel cell cathode 46 through stream 31. The cathode exhaust stream 31, which is mainly nitrogen with residuals of carbon dioxide, water vapour and oxygen, enters heat exchanger 44 to heat water stream 43 and produce steam in stream 45, which is mixed with heated natural gas stream 7, the mixed stream 8 is fed to the fuel cell anode 47 reformer to produce hydrogen and carbon dioxide. The cathode exhaust stream 32 is further cooled in heat exchanger 6, heating fuel cell anode natural gas supply stream 5, and is exhausted into the atmosphere through stream 33. The recovered water stream 39 from separator 15 enters pump 40 and is pumped into stream 52. A circulating water stream 43 is routed to heat exchanger 44 to produce steam for the fuel cell anode 47 reformer as discussed above. The balance of the water enters pump 53 where it is pressurized to reach an optimal operating pressure for the oil reservoir. The pressurized water stream 41 enters heat exchanger 11 to produce steam in stream 42 at a desired pressure and temperature. The recovered carbon dioxide liquid stream 34 is routed to pump 35 and pressurized to a desired pressure. The pressurized liquid carbon dioxide stream 36 is routed through heat exchanger 19 to give up its coolth, and the warmer carbon dioxide stream 37 is further heated in heat exchanger 13 to a desired temperature.

The process allows for the recovery of the water and carbon dioxide components of a fuel cell anode exhaust stream by condensation in a counter current heat exchange process configuration. The recovered fluid streams may then be pressurized and re-heated in a counter current heat exchange process configuration to meet specific conditions for various purposes.

Figure 2:
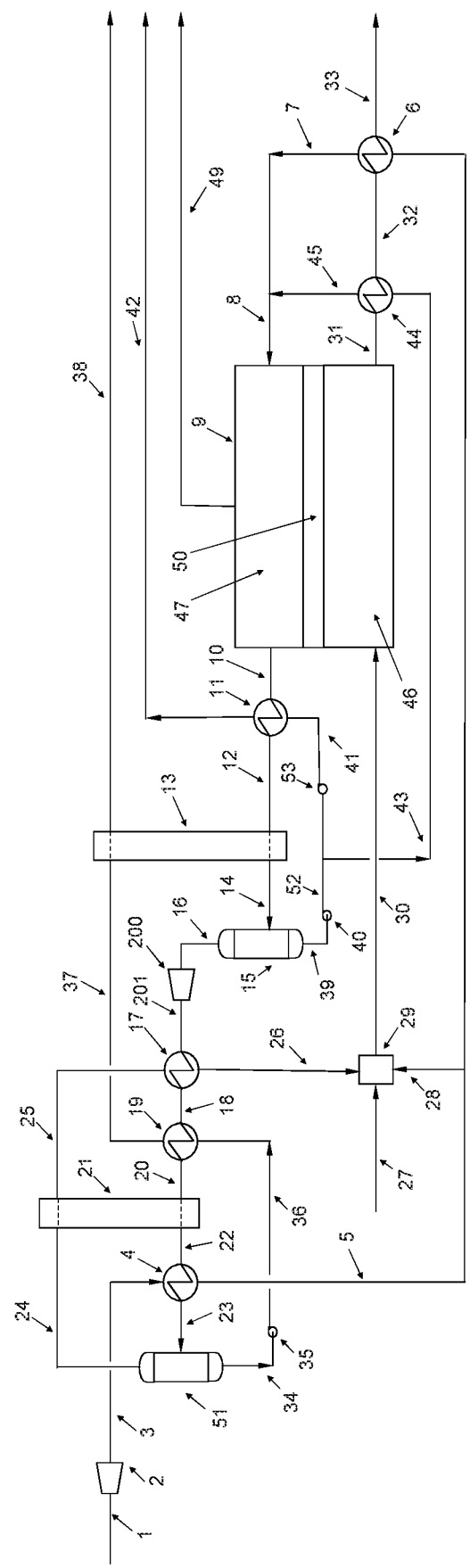
FIG. 2 is a schematic diagram of an alternative method of recovering the fuel cell anode exhaust stream that employs a compression step in the separated anode exhaust stream.

Those skilled in the art will understand that variations of the above-described process are possible, and that designs other than what is depicted may be used to accomplish similar process steps. Some non-limiting examples are given below. Referring to FIG. 2, the process is similar to that shown in FIG. 1, however the concentrated carbon dioxide anode exhaust stream 16 is compressed by compressing stream 16 with compressor 200 to produce a higher pressure stream 201. This may be used to meet desired carbon dioxide properties in stream 16 based on the pressure enthalpy diagram for carbon dioxide recovery as a liquid.

Figure 3:
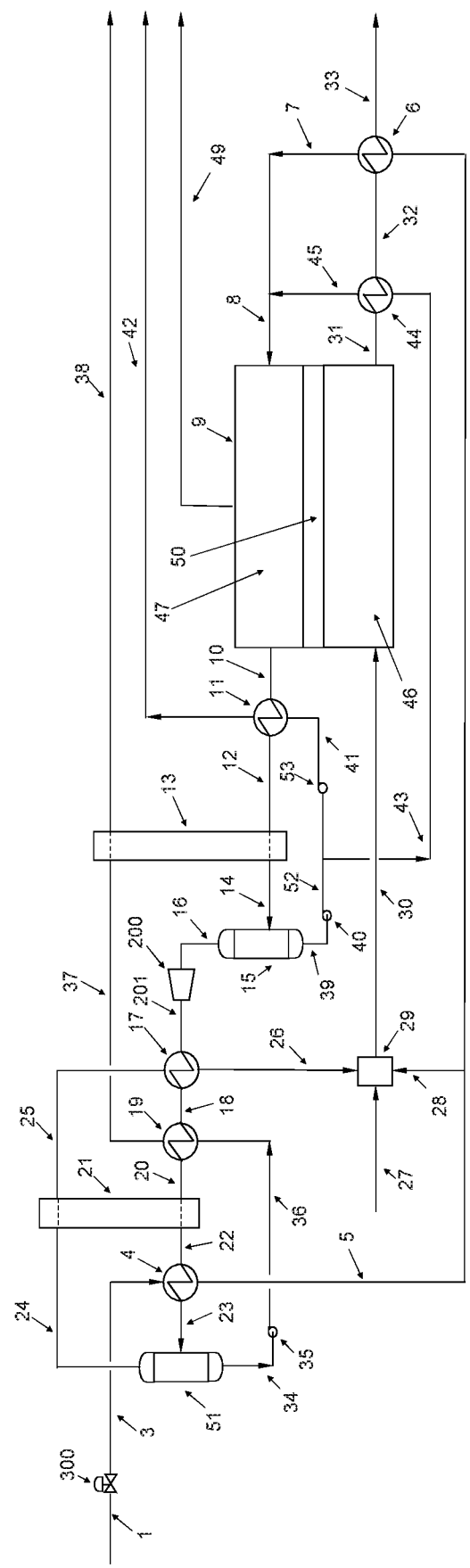
FIG. 3 is a schematic diagram of an alternative method of recovering the fuel cell anode exhaust stream that employs a pressure reducing valve in the fuel cell natural gas supply in lieu of an expander/generator.

Referring to FIG. 3, another variation is shown, in which the main transmission natural gas pipeline pressure supply stream 1 is provided with a JT (Joules Thompson) valve 300 in lieu of an expender/generator to reduce the pressure of the natural gas. The use of a JT valve is not as efficient as an expander/generator but it is an alternative method of operation that may reduce the capital cost requirements.

Figure 4:
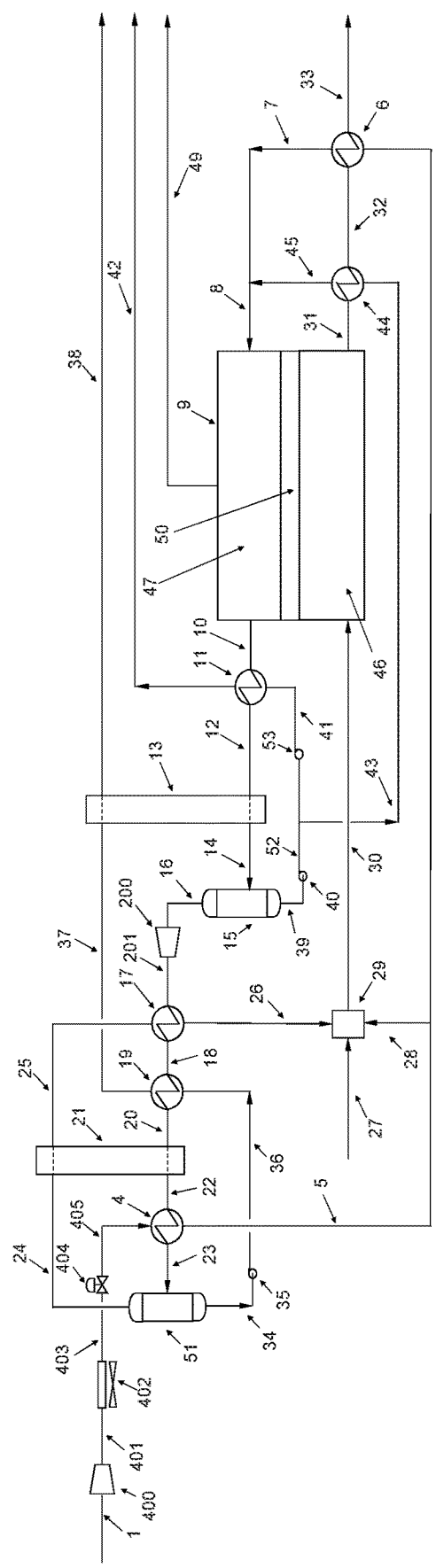
FIG. 4 is a schematic diagram of an alternative method of recovering the fuel cell anode exhaust stream that compressing the fuel cell natural gas supply, and uses an ambient air heat exchanger before a pressure reducing valve, to produce a refrigerant natural gas supply.

Referring to FIG. 4, another variation is shown, in which a compressor 400 is used to increase the pressure in main transmission natural gas pipeline supply stream 1, in case the available natural gas pipeline pressure is lower than what is required to generate a refrigerant natural gas stream as in FIG. 1. The higher pressure transmission natural gas supply stream 401 is first cooled by ambient air heat exchanger 402, the ambient air cooled higher pressure natural gas supply stream 403 is depressurized through JT valve 404 to produce a refrigerant natural gas stream 405. It is understood, JT valve 404 can be substituted by an expender/generator to produce a colder refrigerant stream 405 if required.

Figure 5:
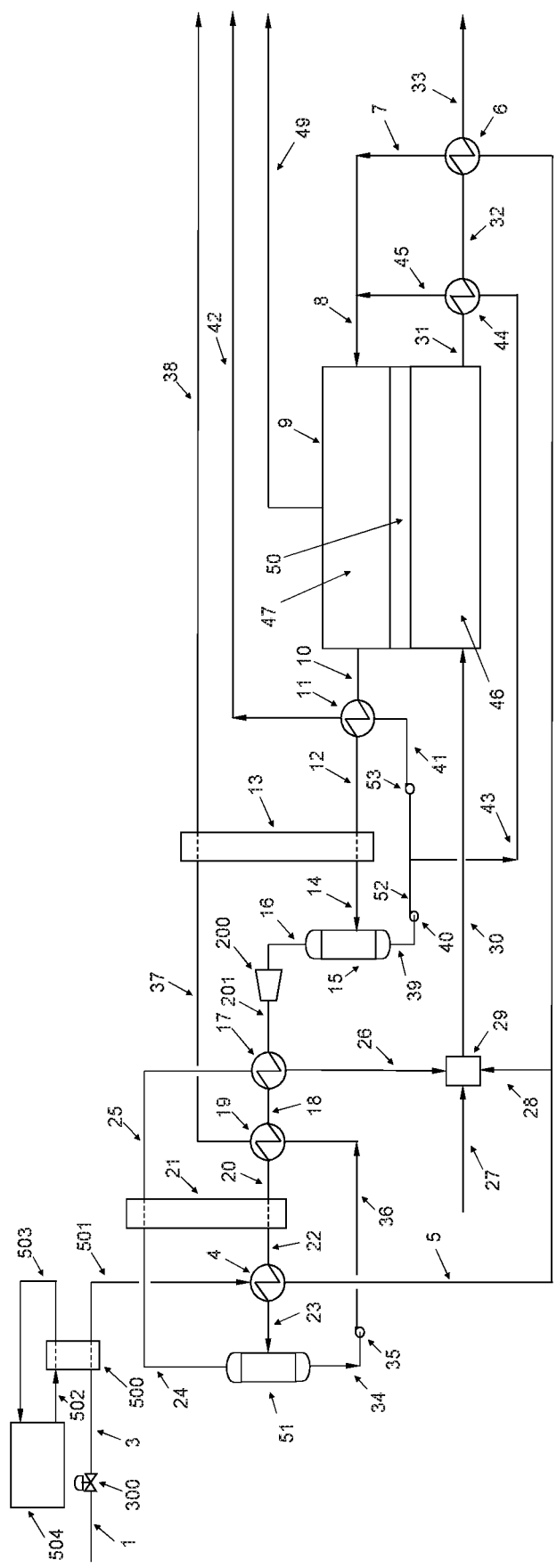
FIG. 5 is a schematic diagram of an alternative method of recovering the fuel cell anode exhaust stream that provides additional refrigeration to the fuel cell natural gas supply after a pressure reducing valve.

Referring to FIG. 5, another variation is shown in which a refrigeration plant is used to increase the refrigeration properties of the natural gas supply stream. The input stream 3 is cooled in a heat exchanger 500 to produce a cooled stream of natural gas 501 that is then passed through heat exchanger 4 as described above. Heat exchanger 500 is cooled by a cooling circuit 502 and 503 that is in turn cooled by a refrigeration unit 504. Refrigeration unit 504 and the fluid circulating through lines 502 and 503 may be selected by those skilled in the art to meet the cooling demands of a particular process.

Figure 6:
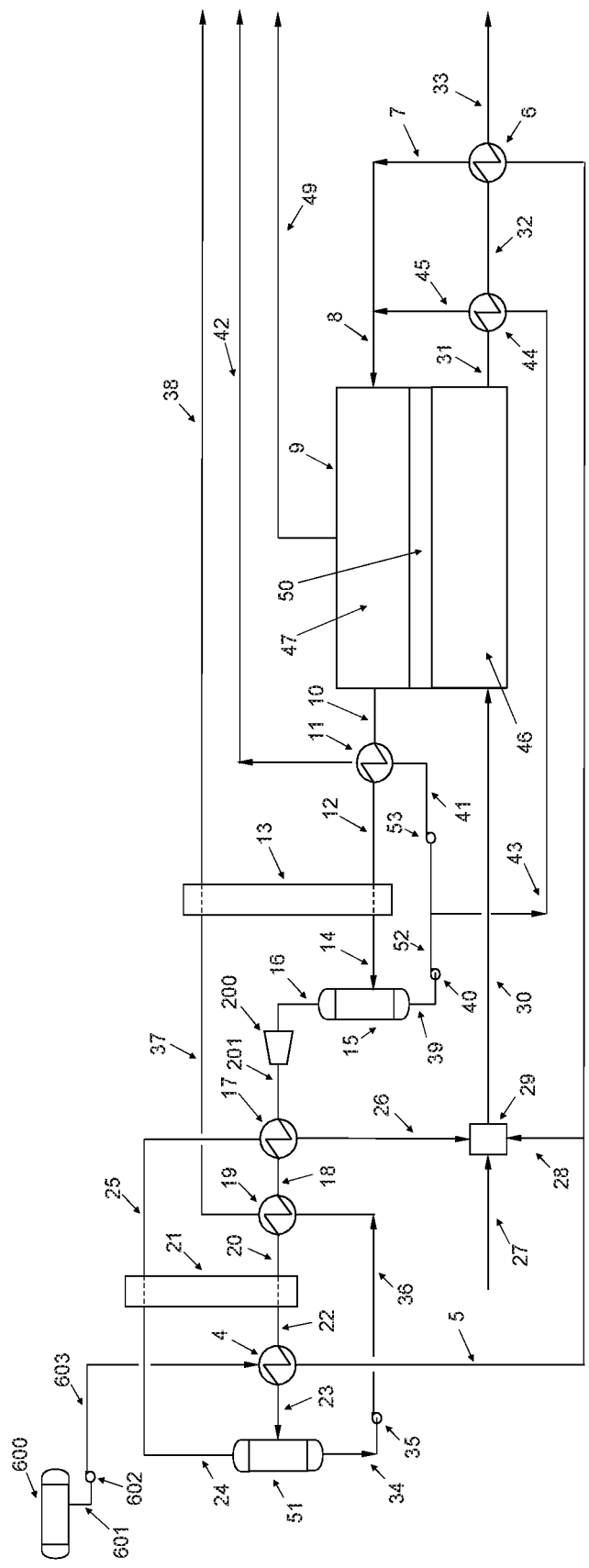
FIG. 6 is a schematic diagram of an alternative method of recovering the fuel cell anode exhaust stream that uses liquid natural gas (LNG) as the fuel cell's natural gas supply.

Referring to FIG. 6, another variation is shown in which the natural gas is supplied from a liquefied natural gas (LNG) drum 600. This option enhances the available refrigeration that may be used to condense the carbon dioxide stream 22 when a supply of natural gas is not available by pipeline or in pressurized tanks. As depicted, LNG from storage drum 600 is fed through stream 601 into pump 602. The pressurized stream 603 is routed through heat exchanger 4 to condense carbon dioxide stream 22.

As will be apparent, the system is preferably based on natural gas as the fuel for the anode, as this provides a readily available, predictable source of fuel. It will be understood that other types of fuel may also be used, such as biogas. Preferably, the fuel will include a hydrocarbon feedstock, examples of which include methane, methanol, biogas, etc. that produces water and carbon dioxide as an exhaust stream that can be used in the process as described herein. In addition, while the fuel cell described herein produces a carbonate ion that traverses the membrane, other fuel cells that operate using a different reaction may also be used, such as a solid oxide fuel cell. The cathode inputs may be varied according to the requirements of the specific fuel cell being used.

Figure 7:
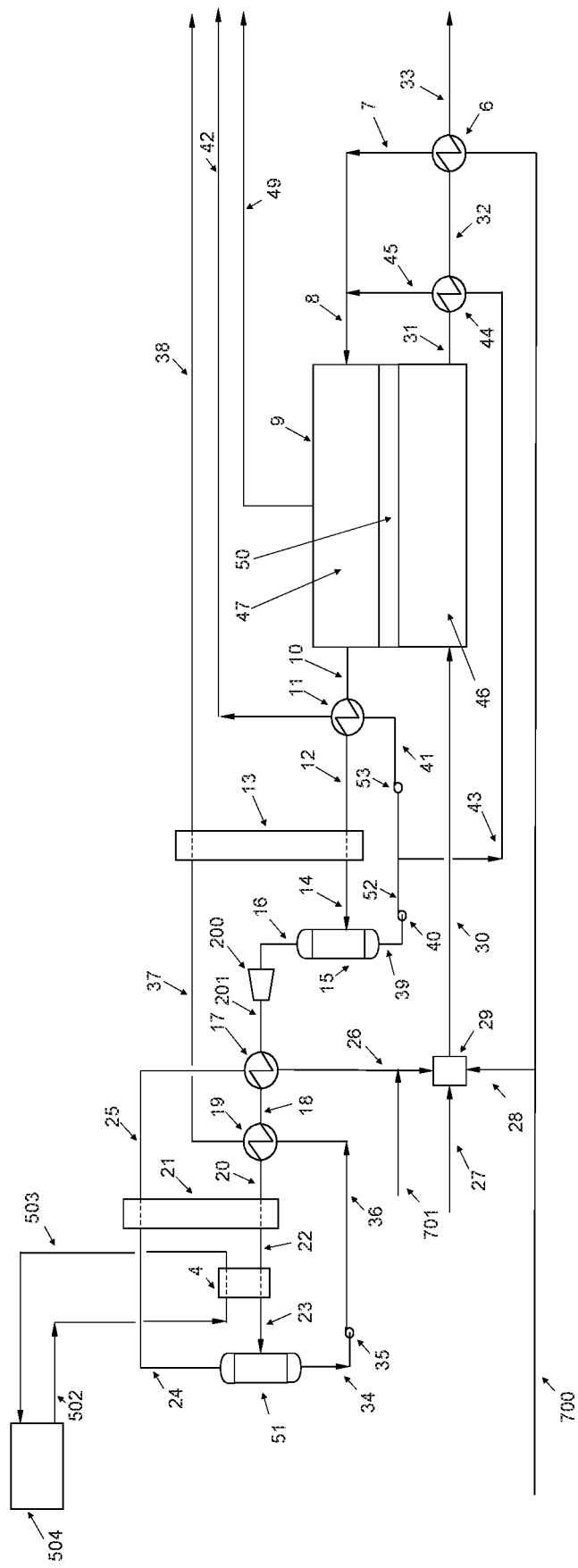
FIG. 7 is a schematic diagram of a fuel cell that is fuelled by alternative sources of fuel, such as biogas.

Referring to FIG. 7, line 700 is used to represent a source of biogas, although other sources of fuel may also be possible, as described above. In a typical biogas, the composition may be around 40% carbon dioxide, 60% methane, and up to 5% hydrogen sulphide. As such, the biogas generally must be treated to remove the carbon dioxide and sulphide components. By removing the carbon dioxide component, the heat content of the volume of biogas supplied to fuel cell 9 is increased. In FIG. 7, the removed carbon dioxide may be introduced via line 701 into the cathode input stream. In addition, alternate sources of carbon dioxide may be provided via line 701 to be used for the input stream to the cathode. Depending on the amount of carbon dioxide, stream 701 may supplement or replace carbon dioxide in stream 26. This may be beneficial, for example, to dispose of carbon dioxide produced by a different industrial process. Pre-air heater 29 may or may not be required, depending on the temperature and pressure of the carbon dioxide and air, and the specifications of the fuel cell.

It will be understood that the variations described with respect to FIG. 2-7 may be combined in various combinations other than those explicitly depicted and described, except where the design choices are clearly mutually exclusive.

There will now be provided two examples of how the process described above may be used.

Supercritical Fluids

A supercritical fluid is a substance at a temperature and pressure above its critical point, where distinct liquid and gas phases do not exist. It can diffuse through solids and dissolve materials like a liquid, close to the critical point small changes in pressure or temperature results in changes in density, allowing many properties of a supercritical fluid to be controlled. Supercritical fluids, due to their properties, are now finding applications in a variety of industrial processes that range from food sciences to pharmaceuticals, cosmetics, polymers, powders, biotechnology, energy and environment. Carbon dioxide and water are the main commonly used supercritical fluids. The use of super critical fluids is limited by production and cost. The process described above may be used to produce supercritical fluids for a variety of purposes in various industries. While the description below is given in terms of producing supercritical carbon dioxide and water, it will be understood that the process may be modified to only produce one or the other, or to produce a variety of temperatures and pressures in one or both streams that is something less than its supercritical state.

In the system described previously, carbon dioxide stream 38 will be at a supercritical state, which is achieved by pressurizing the carbon dioxide in pump 35, which may represent a series of pumps, to a desired pressure, and heating the carbon dioxide in heat exchangers 19 and 13, each of which may represent a series of heat exchangers, to achieve a desired temperature. Similarly, water stream 42 will be at a supercritical state after being pressurized by pumps 52 and 53, and heated in heat exchanger 11 to the desired temperature and pressure. The system described above may be used to produce supercritical fluids. It is preferred that pumps are used to increase the pressure prior to heating the fluid, as this results in a more efficient process.

The various examples and modifications of processes shown in FIG. 1-7 may be used as desired to produce supercritical fluids, with the understanding that temperature and pressure points will be modified according to principles that are known in the industry to produce the desired temperatures and pressures.

Figure 8:
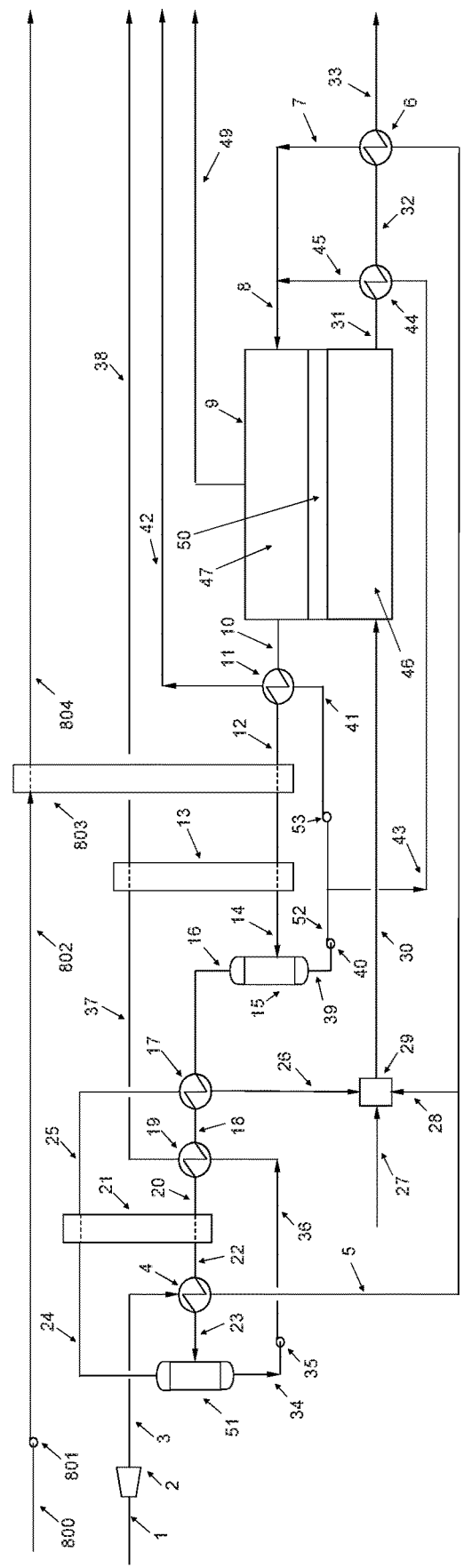
FIG. 8 is a schematic diagram of a fuel cell that is used to produce a supercritical fluid stream from an external source of fluid.
Figure 9:
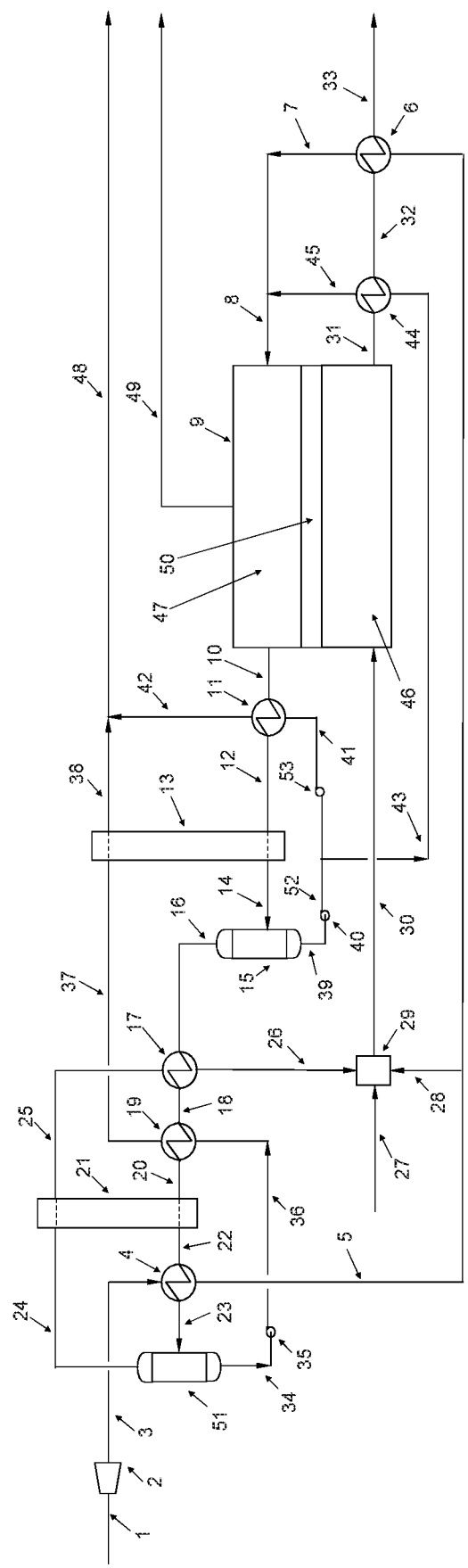
FIG. 9 is a schematic diagram of a fuel cell with the water, carbon dioxide and thermal energy of the anode exhaust stream being recovered for injection into an oil production reservoir.
Figure 10:
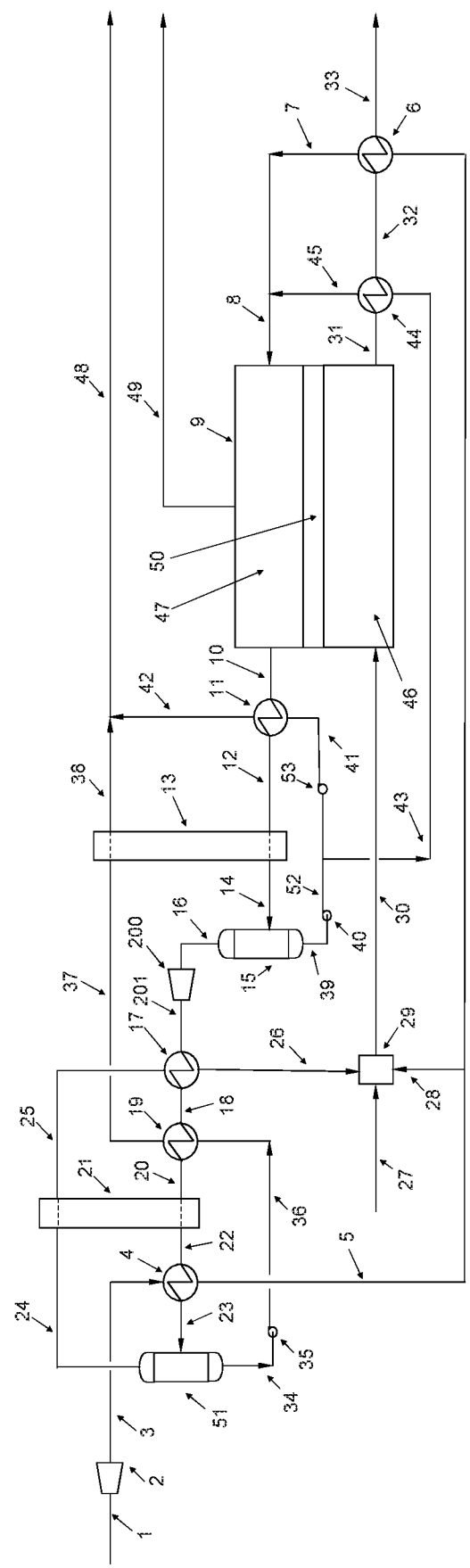
FIG. 10 is a schematic diagram of an alternative method of recovering the fuel cell anode exhaust stream that employs a compression step in the separated anode exhaust stream.
Figure 11:
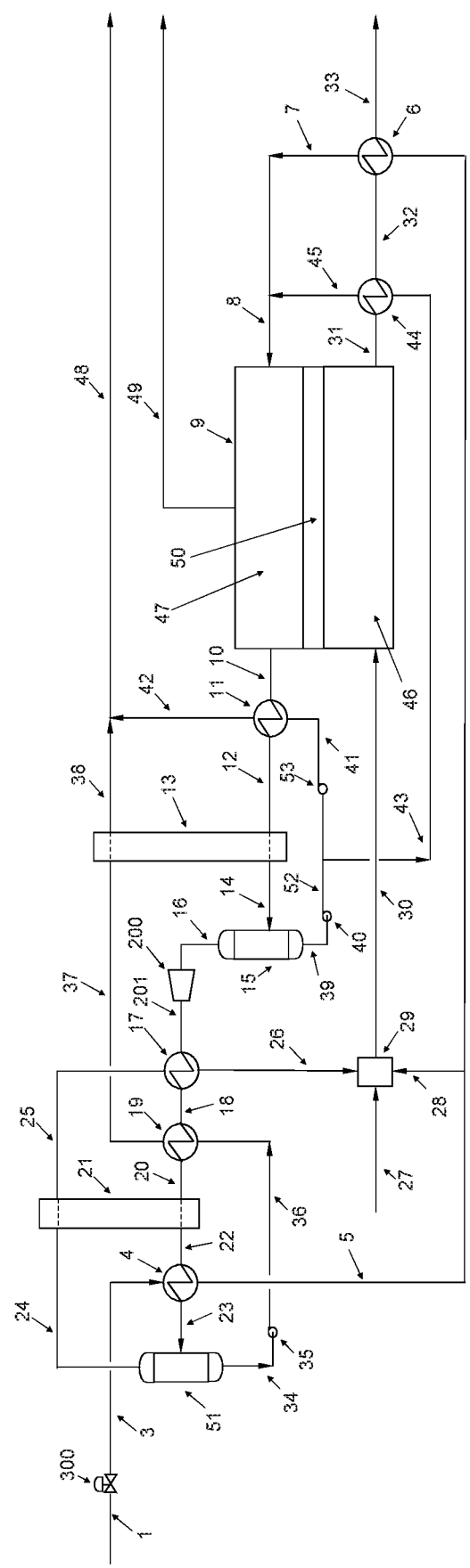
FIG. 11 is a schematic diagram of an alternative method of recovering the fuel cell anode exhaust stream that employs a pressure reducing valve in the fuel cell natural gas supply in lieu of an expander/generator.
Figure 12:
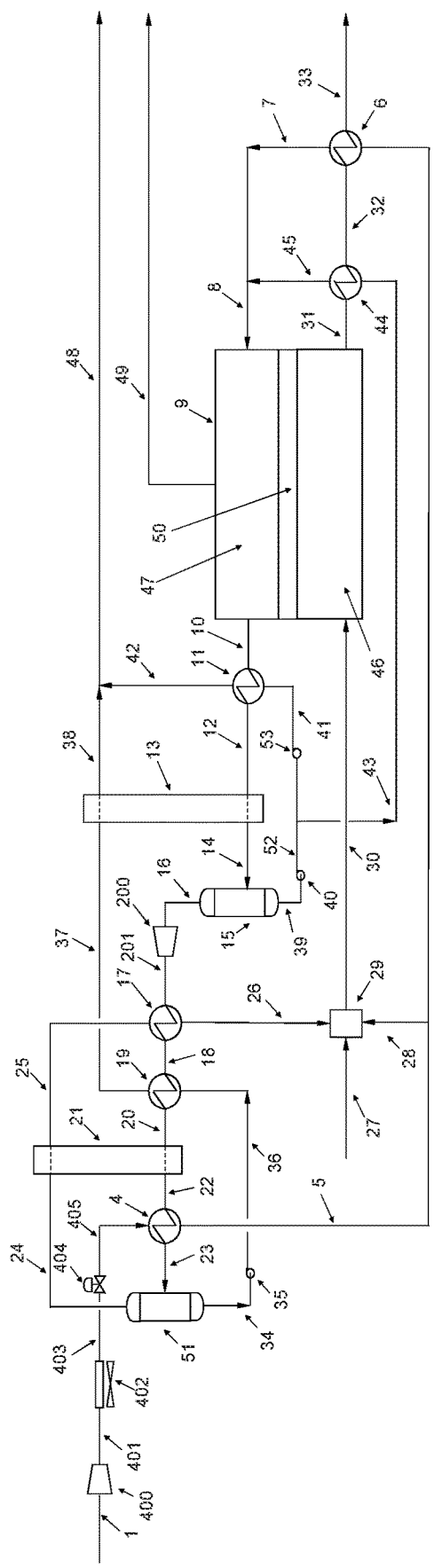
FIG. 12 is a schematic diagram of an alternative method of recovering the fuel cell anode exhaust stream that compressing the fuel cell natural gas supply, and uses an ambient air heat exchanger before a pressure reducing valve, to produce a refrigerant natural gas supply.
Figure 13:
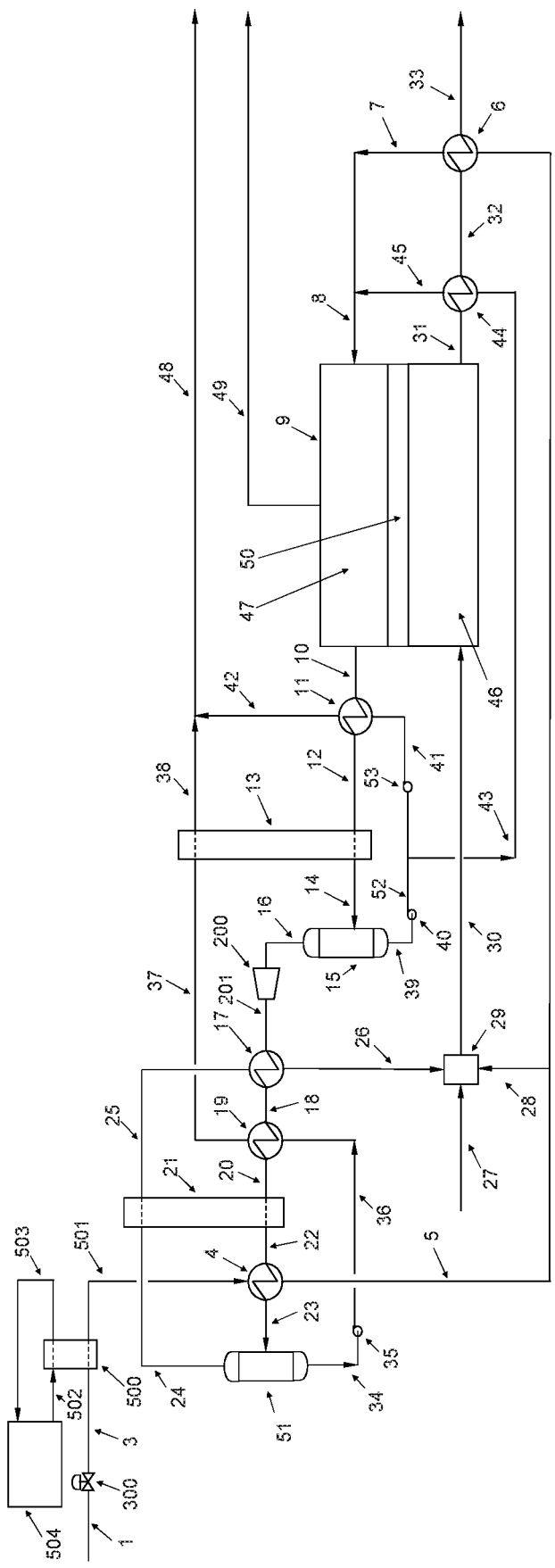
FIG. 13 is a schematic diagram of an alternative method of recovering the fuel cell anode exhaust stream that provides additional refrigeration to the fuel cell natural gas supply after a pressure reducing valve.
Figure 14:
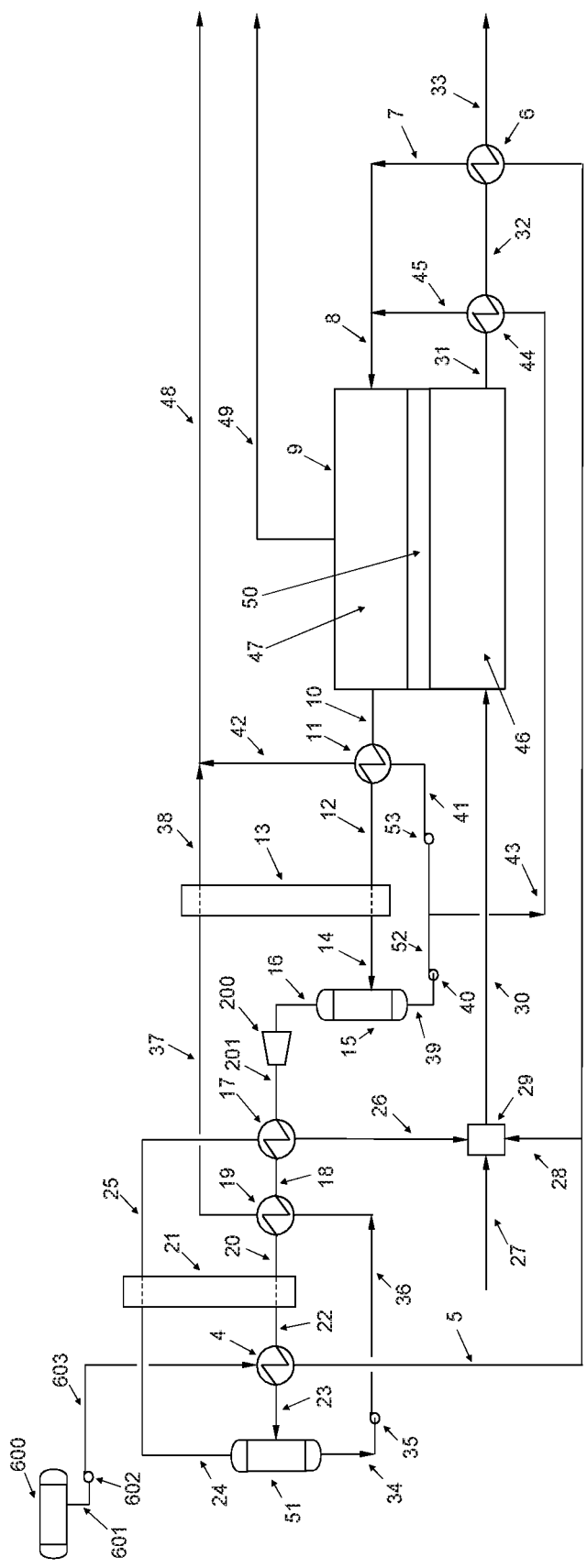
FIG. 14 is a schematic diagram of an alternative method of recovering the fuel cell anode exhaust stream that uses liquid natural gas (LNG) as the fuel cell's natural gas supply.
Figure 15:
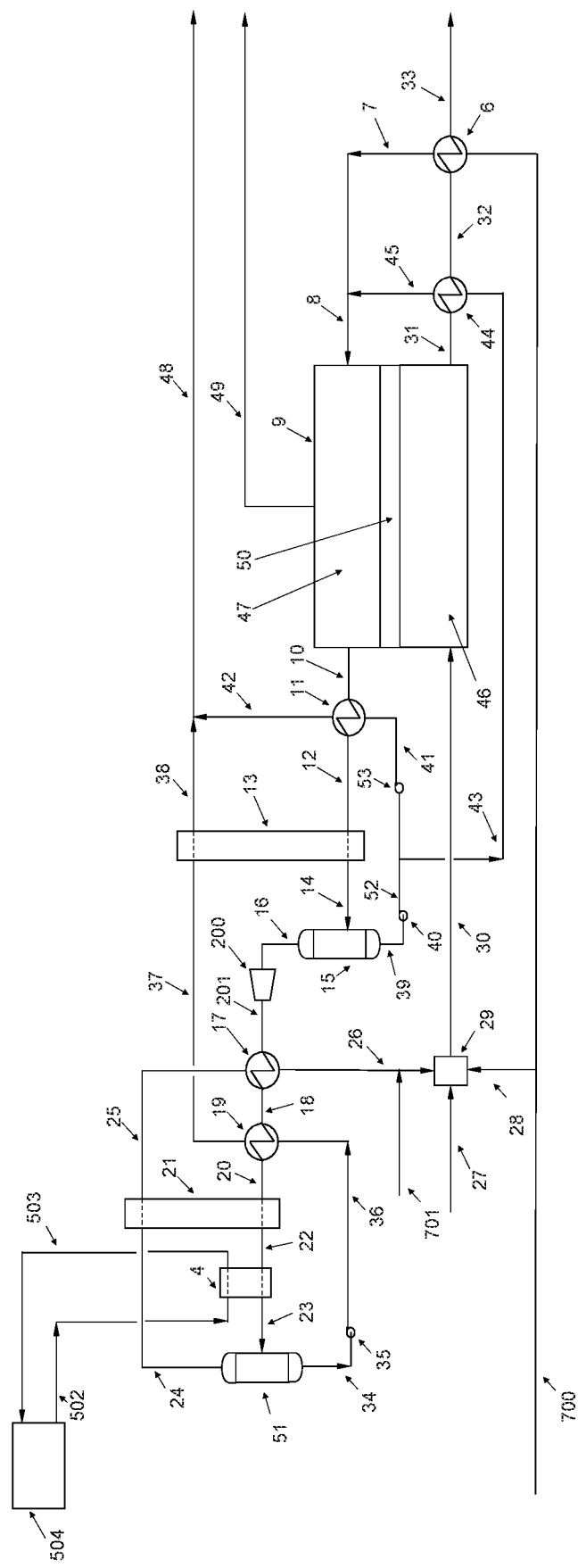
FIG. 15 is a schematic diagram of a fuel cell that is fuelled by alternative sources of fuel, such as biogas.

In addition, referring to FIG. 8, the process may also be used to heat and pressurize an external fluid to produce a supercritical state. As shown, an external source of fluid 800 is first pressurized in pump 801, and the pressurized stream 802 is heated in heat exchanger 803 to produce a supercritical fluid stream 804. A benefit of the process configuration in FIG. 8 is the ability to produce other supercritical fluids from the thermal energy available in the fuel cell anode exhaust stream. While this variation is given in terms of producing supercritical fluids, it will be understood that it may also be applied in other areas and to produce heated and/or pressurized fluids that are not supercritical.

Oil Production

The example that will now be described is able to supply thermal energy, water and carbon dioxide to oil production fields from a fuel cell anode exhaust stream. The method uses a different approach to provide steam and/or solvents for the enhancement of oil production. The system here described takes advantage of a concentrated hot exhaust gas stream from a fuel cell anode to deliver the steam and carbon dioxide required at optimal temperature and pressure operating conditions to reduce oil viscosity and enhance oil production in an oil reservoir.

Currently, a variety of processes are used to recover viscous hydrocarbons such as heavy oil or bitumen from underground oil deposits. Typically, in situ methods are used in heavy oil or bitumen at depths greater than 50 meters where it is no longer economic to recover the hydrocarbon by current surface mining technologies. Depending on the operating conditions of the in situ process and the geology of the reservoir, in situ processes can recover between 25 and 75% of the oil.

The primary focus associated with producing hydrocarbons from such deposits is to reduce the in situ viscosity of the heavy oil so it can flow from the reservoir to the production well pipeline. The present industry practice to reduce in situ heavy oil viscosity involves raising the reservoir temperature with steam and/or by dilution with solvents.

Steam Assisted Gravity Drainage (SAGD) is a popular in situ oil recovery method. SAGD uses two horizontal well pipelines (a well pair) positioned in a reservoir to recover hydrocarbons. This method is more environmentally benign than oil sands mining. In the SAGD process, two well pipelines are drilled paralleled to each other by directional drilling. The bottom well pipeline is the production well pipeline and is typically located just above the base of the reservoir. The top well pipeline is the injection well pipeline and is typically located between 15 and 30 feet above the production well pipeline. The top well pipeline injects steam into the reservoir from the surface. In the reservoir, the injected steam flows from the injection well pipeline and loses its latent heat to the heavy oil or bitumen, as a result the viscosity of the heated heavy oil or bitumen decreases and the heated heavy oil flows under the force of gravity towards the production well pipeline located below the injection well pipeline. Anywhere between 4 and 20 well-pairs are drilled on a particular section of land or pad. All the well-pairs are drilled parallel to one another, about 300 feet apart, with half of the well-pairs oriented in one direction, and the other half of the well-pairs typically oriented 180° in the opposite direction to maximize reservoir coverage. A 15 ft separation between injection and production well pipelines has been proven to be the optimal gap which allows for the maximum reservoir production due to the most effective impact of the injected steam. Although the separation between injector and production wells pipelines are planned for 15 ft, some wells have as high as 30 ft gaps, reducing production capability from that particular zone. Typically, a SAGD process is considered thermally efficient if its Steam to Oil Ratio (SOR) is 3 or lower. The SAGD process requires about 1,200 cubic feet of natural gas to generate steam per 1 barrel of bitumen produced. Canada National Energy Board (NEB) estimates capital cost of $18-$22 to produce a barrel of bitumen by the SAGD method. The high ratio of water requirement for steam generation in the SAGD process is forcing the industry to look at alternative processes to reduce water consumption.

An alternative process to reduce steam usage is an extension of the SAGD process, the Steam and Gas Push (SAGP) where steam and a non-condensable gas are co-injected into the reservoir. The non-condensable gas provides an insulating layer and improves the thermal efficiency of the process, resulting in a reduction of steam requirements.

Another alternative process, to replace steam usage is the Vapour Extraction Process (VAPEX) where a solvent is injected into the reservoir. Similar to SAGD, it consists of two horizontal well pipelines positioned in the reservoir, whereas the top well is the injection well pipeline and the bottom well is the production well pipeline. In VAPEX, a gaseous solvent such as propane is injected into the reservoir instead of steam. The injected solvent condenses and mixes with the heavy oil or bitumen to dilute and reduce its viscosity. Under the action of gravity, the mixture of solvent and bitumen flow towards the production well pipeline and is pumped to the surface. A major concern with the VAPEX process is how to control the significant solvent losses to the reservoir, which has a large impact on its economics.

More recently, new processes such as Combustion Assisted Gravity Drainage and Toe to Heel Air Injection (THAI) are promoted as being more environmentally responsible since no emissions are released into the atmosphere. These processes employ in situ combustion to heat the reservoir by compressing combustion air into the reservoir to support in-situ combustion. In all of the described processes, the objective is to reduce viscosity and increase oil flow to the production well pipeline.

Another process involves an injection well and a production well, both of which are vertical. Water, carbon dioxide, or a combination of both may be used to pressurize the injection well and flush oil from a subsurface oil-bearing formation into the production well. This is sometimes referred to as a "huff and puff" process.

The presently described system allows for an improved method of recovering a fuel cell anode exhaust stream where both the components and its thermal energy are recovered for immediate use in-situ to replace the current practices of importing carbon dioxide and generating steam for injection into an oil reservoir to heat and reduce oil viscosities to enhance oil production. This new method recovers an exhaust gas stream of water and carbon dioxide that is typically discharged into the atmosphere as a by-product of a power generation plant to substantially improve the thermal requirements of an oil producing reservoir. The description of application of the method should, therefore, be considered as an example.

Figure 16:
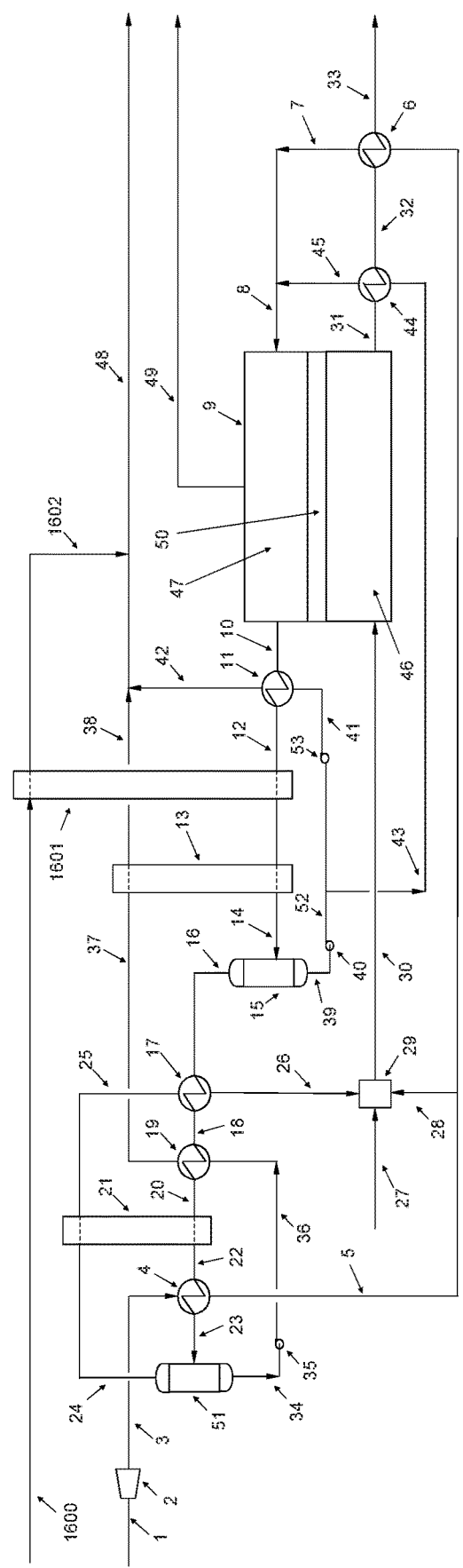
FIG. 16 is a schematic diagram of an alternative method of recovering the fuel cell anode exhaust stream that permits water or solvents to be added to the recovered injection stream to the reservoir.

The process as modified for use in downhole operations is shown in FIGS. 9-15. The process is similar to what is described with respect to FIG. 1-7, but has been modified to show carbon dioxide stream 38 and water stream 42 combined into a downhole injection stream 48. In particular, the pressurized water stream 41 enters heat exchanger 11 to produce steam in stream 42, and is mixed with heated carbon dioxide stream 38. The recovered carbon dioxide liquid stream 34 is routed to pump 35 and pressurized to meet optimal reservoir operating pressure. The pressurized liquid carbon dioxide stream 36 is routed through heat exchanger 19 to give up its coolth, and the warmer carbon dioxide stream 37 is further heated in heat exchanger 13. The mixed steam and hot carbon dioxide mixture may then be injected into the oil reservoir through stream 48. It will be understood that the conditioned steam and carbon dioxide may also be injected downhole in separate streams A variation is shown in FIG. 16. In this variation, an external source of water or solvent 1600 is heated in heat exchanger 1601 and passed through stream 1602 to be mixed into stream 48 along with carbon dioxide from stream 38 and steam from stream 42 for injection into an oil reservoir. The benefit of this process configuration is the ability to add more steam or a solvent to the reservoir since the temperatures generated by a fuel cell anode exhaust are typically twice as high as common industry steam temperature generated for SAGD operations. This difference in temperature allows for the addition of water or solvent to a fuel cell anode exhaust mass injected into an oil reservoir. It will be understood that this variation may be modified and applied for other purposes as well, where it may be beneficial to introduce an additive to a conditioned fluid, which may include a supercritical fluid.

The method described herein allows for the efficient recovery of components and thermal energy from a fuel cell anode exhaust stream at a power generation plant to provide steam and/or a solvent to enhance oil production, which may be used to replace in whole or in part the current practice of steam generation and purchased carbon dioxide for stimulation of an oil reservoir to increase oil production. The method may also be used for other downhole purposes, such as for carbon dioxide sequestration, in which the carbon dioxide stream is injected downhole. The water stream likely would not be injected downhole in this example, as it could be diverted for other uses, and the carbon dioxide stream may not be heated to the same temperatures, which would allow the thermal energy to be used for other purposes.

When injecting the streams of carbon dioxide and water downhole in a SAGD-type operation, or an operation in which the goal is to improve the viscosity of the oil, benefits may be had beyond merely transferring the heat to the oil. For example in some circumstances, the carbon dioxide may mix with the oil and reduce its viscosity. In other circumstances, the carbon dioxide and water may react to form carbonic acid, which may help open the formation and increase the flow of oil. In other situations, the products of the fuel cell may be used in other production techniques, such as in situ cracking production to produce lighter oil. The high temperatures and electrical energy produced by the fuel cell may be used to generate favourable conditions to promote hydrocracking downhole, or in other reactions that may increase the production rate of the oil, and may increase the value of the oil being produced. Some techniques may require additional reactants, and it will be apparent to those skilled in the art how the presently described system could be adapted to produce, heat, or otherwise condition the necessary components to be injected with the carbon dioxide and/or water downhole to accomplish the desired downhole reaction.

The current industry practice is first to treat water in preparation for steam generation, this is done at a considerable cost due to the concern of scaling in the boilers. Secondly, the steam temperature generated is limited by its evaporation temperature at operating pressures, to minimize scaling in the boilers, a once through boiler is preferred, resulting in wet steam.

The method described herein generates a stream carbon dioxide and steam by an electrochemical reaction of hydrogen and a carbonate ion that is condensed, recovered, pumped and re-heated to an oil reservoir optimal operating conditions to enhance the production of oil.

OTHER EXAMPLES

The examples presented above relate generally to two industrial processes that can benefit from using the products of a fuel cell in order to produce electricity, either for use in the industrial process or for sale, and to produce heated and pressurized fluids that would be expensive to produce from what would otherwise be considered waste streams from the fuel cell.

It will be understood that there are other industrial processes that may benefit from the approach described herein. For example, the process may be used to produce supercritical water that may be used in an oil upgrader. Alternatively, fluids at temperatures and pressures less than supercritical may find use in other processes.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given a broad purposive interpretation consistent with the description as a whole.

What is claimed is:

1. A method of producing temperature and pressure conditioned fluids using a fuel cell, the fuel cell having an anode inlet, an anode exhaust, a cathode inlet, and a cathode exhaust, the method comprising the steps of:
   operating the fuel cell to generate an anode exhaust stream comprising water vapour vapor and carbon dioxide;
   condensing and separating the water vapor from the anode exhaust stream to produce a stream of water and a stream of carbon dioxide;
   heating a first portion of the stream of water to produce a stream of steam;
   combining the stream of steam and the fuel to form the anode input stream;
   obtaining a stream of condensed carbon dioxide by condensing at least a portion of the carbon dioxide in the stream of carbon dioxide; and
   heating and pressurizing at least one fluid to a target temperature and pressure for each fluid, the at least one fluid comprising at least one of a second portion of the stream of water and at least a portion of the condensed carbon dioxide.

2. The method of claim 1, wherein the second portion of the stream of water and the at least a portion of the condensed carbon dioxide are each heated to a respective target temperature and pressure.

3. The method of claim 1, wherein the desired temperature and pressure comprises a supercritical state of the at least one fluid.

4. The method of claim 1, wherein the target temperature and pressure comprises a temperature and pressure suitable to enhance oil production.

5. The method of claim 1, wherein the fuel of the anode input stream comprises a stream of hydrocarbons.

6. The method of claim 5, wherein the stream of hydrocarbons is obtained from a supply of natural gas, the supply of natural gas being used as a refrigerant to condense the portion of the carbon dioxide to form the stream of condensed carbon dioxide.

7. The method of claim 6, wherein the supply of natural gas is a liquid natural gas (LNG) tank.

8. The method of claim 6, wherein the supply of natural gas is a pressurized stream of natural gas, and wherein the pressurized stream of natural gas is expanded and cooled to produce cold temperatures.

9. The method of claim 6, wherein the supply of natural gas is passed through at least one of a refrigeration plant, and a condenser and air cooler.

10. The method claim 1, wherein the target temperature and pressure are controlled to meet desired fluid properties using a pressure enthalpy diagram of each fluid.

11. The method claim 1, wherein, after condensing, the stream of carbon dioxide is separated into the stream of condensed carbon dioxide and a cathode stream of carbon dioxide.

12. The method of claim 11, further comprising the step of combining oxygen and the cathode stream of carbon dioxide to form the cathode input stream.

13. The method of claim 12, wherein forming the cathode input stream comprises combining the first stream of carbon dioxide and atmospheric air.

14. The method of claim 12, wherein the anode exhaust stream further comprises residual hydrogen, and wherein the cathode stream of carbon dioxide further comprises the residual hydrogen.

15. The method of claim 14, wherein forming the cathode input stream further comprises preheating the first stream of carbon dioxide and oxygen in a combustion heater that is fuelled by a hydrocarbon and the residual hydrogen.

16. The method of claim 1, further comprising the step of supplying carbon dioxide for the cathode input stream from a source of captured carbon dioxide.

* * * * *